July 17, 1928.  1,677,677
D. D. IRWIN
SAGGAR MAKING MACHINE
Filed July 25, 1927  3 Sheets-Sheet 1
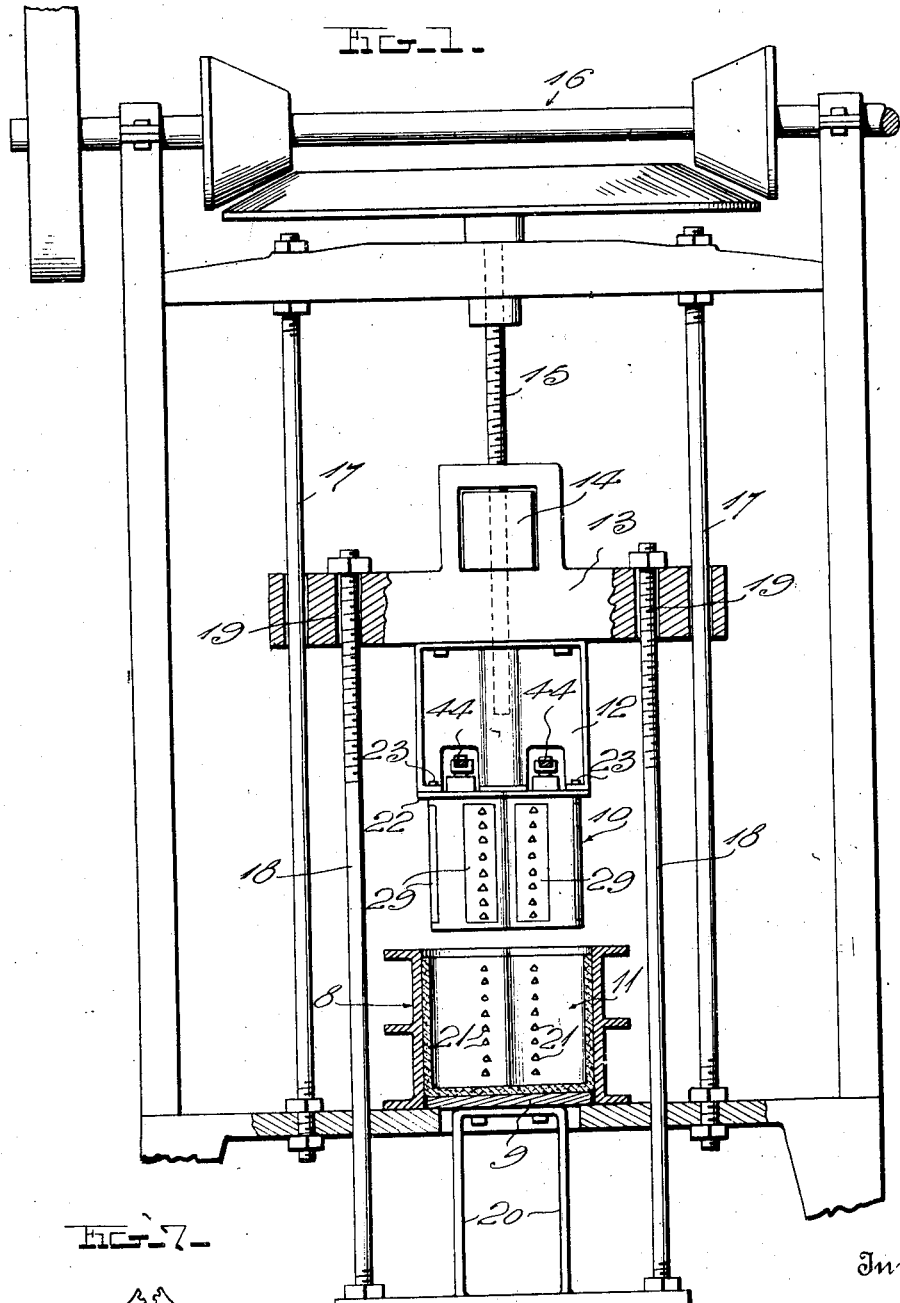
Inventor
D. D. Irwin
By H. B. Wilson &c.
Attorneys July 17, 1928.
D. D. IRWIN
1,677,677
SAGGAR MAKING MACHINE
Filed July 25, 1927 3 Sheets-Sheet 2
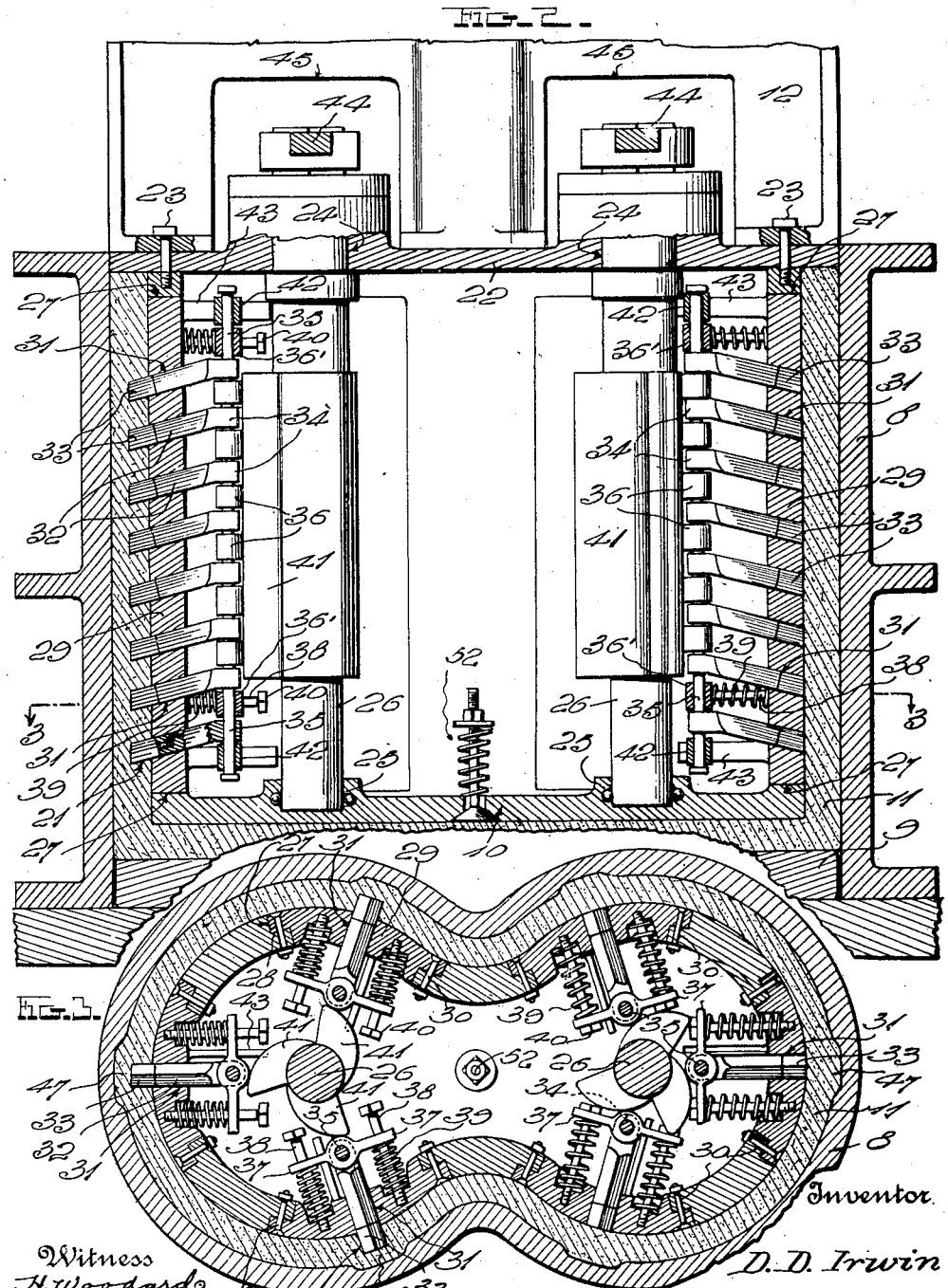

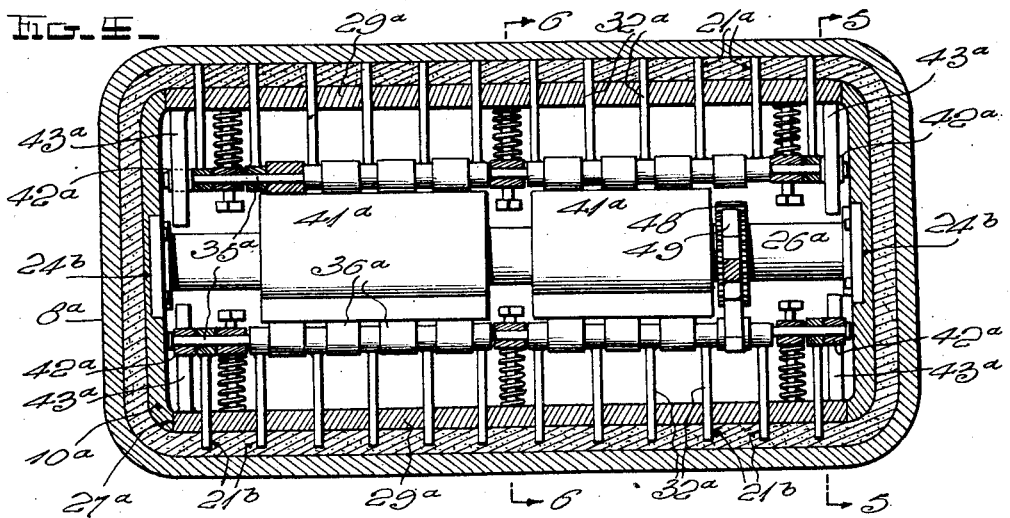
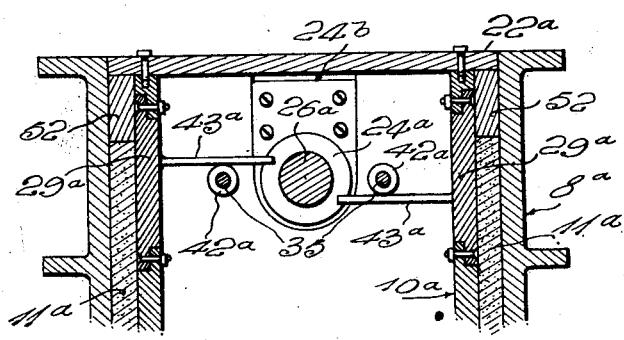
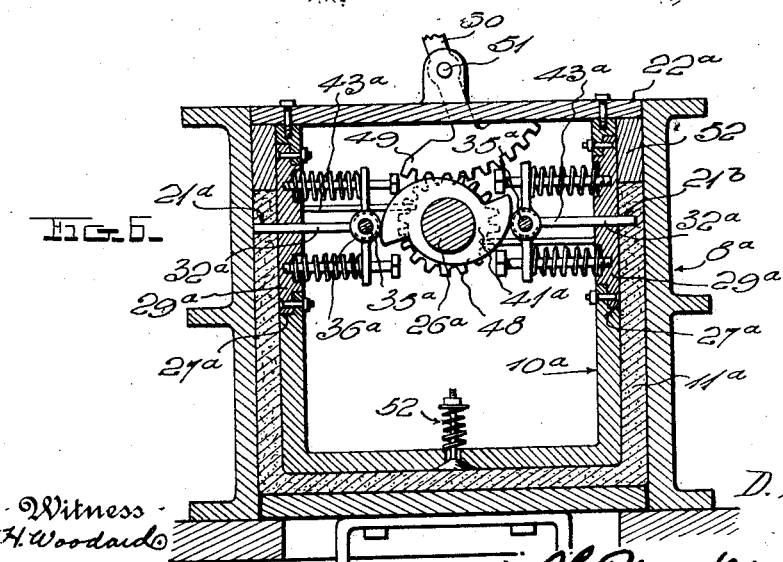

Patented July 17, 1928.

1,677,677

UNITED STATES PATENT OFFICE.

DEWITT DILWORTH IRWIN, OF EAST LIVERPOOL, OHIO, ASSIGNOR OF ONE-HALF TO EDWIN M. KNOWLES, OF NEWELL, WEST VIRGINIA.

SAGGAR-MAKING MACHINE.

Application filed July 25, 1927. Serial No. 208,257.

The invention relates to machines used in the formation of saggars for the china manufacturing and analogous industries.

Saggar forming machines commonly embody a mold member having a removable bottom upon which a quantity of clay or the like is placed, a plunger movable into the mold to displace the clay and form the saggar between the mold and plunger, and operating means for the plunger and the removable bottom. After formation of the saggar and removal thereof from the mold, sockets or the like are commonly punched therein by hand to receive the usual pins which either directly support the articles to be fired, or hold them against tilting while standing on edge.

It is the object of the present invention to provide a plunger for a saggar forming mold, provided with novel and advantageous means for punching the necessary sockets or openings in the completed saggar before withdrawal of said plunger or removal of the saggar from the mold.

With the foregoing in view, the invention resides in the novel subject matter hereinafter described and claimed, the description being supplemented by the accompanying drawings.

Fig. 1 is a side elevation, partly in section showing a saggar forming machine constructed in accordance with my invention.

Fig. 2 is an enlarged vertical sectional view through the mold and the improved plunger, showing one set of the punches projected and another set retracted.

Fig. 3 is a horizontal section on line 3—3 of Fig. 2.

Fig. 4 is a horizontal sectional view through a mold and a punch-equipped plunger therefor, shaped to form a different kind of saggar from that formed by the construction of Figs. 1, 2 and 3.

Figs. 5 and 6 are transverse sectional views on the correspondingly numbered lines of Fig. 4.

Fig. 7 is a fragmentary elevation partly in section illustrating the manner in which the punch-operating cam shafts of Figs. 1, 2 and 3 may be connected for movement in unison if desired.

In the drawings above briefly described, 8 denotes a saggar mold having an upwardly removable bottom 9, and 10 denotes a plunger co-operable with said mold in forming a saggar 11. A spacer 12 is shown connecting the upper end of the plunger 10 with a cross head 13 having a nut 14 into which a plunger-operating screw 15 is threaded, said screw being rotatable in either direction by conventional means such as denoted at 16.

17 merely denotes guide rods for the cross head 13 and 18 has reference to additional rods slidably connected with said cross head and provided with appropriate means 20 carrying the mold bottom 9.

All of the construction so far described is well known and is merely embodied in the present application to give a complete understanding of the invention hereinafter described. The clay is placed upon the bottom 9 in the usual manner, the plunger 10 is forced downwardly to displace the clay, and form the sagger 11 between plunger and mold, the punches hereinafter described are then projected from the plunger 10 to form the pin-receiving openings or sockets 21 in the saggar wall, such punches are then retracted, the plunger 10 is raised and after such raising, the parts of the machine designed for lifting the bottom 9, come into play, causing said bottom to eject the completed saggar from the mold 8.

Before proceeding, it may be stated that the mold 8 may be of any desired shape and size according to the construction of the saggar to be produced, and the shape and size of the plunger will of course vary in the same manner.

The plunger 10 is hollow and is preferably formed from cast metal with its bottom and side wall integral, whereas the top 22 of said plunger is removable and may be held in place by any desired means such as cap screws 23. These same screws may, if desired, be used to connect the spacer 12 with the plunger, as will be clear from Fig. 2. The bottom and top of the plunger are provided at proper locations with vertically alined bearings 24 and 25 respectively, each set of bearings receiving a vertical cam shaft 26. Vertical slots 27 are formed in the side wall of the plunger and are spaced apart around the shaft 26, said slots having transversely stepped side walls 28. Removable plates 29, preferably formed of steel, are received in these slots and are provided with stepped longitudinal edges tightly engaging the stepped side walls of said slots, said plates 29 being secured to the plunger wall by bolts 30. These plates carry the punches hereinafter described and mounting means for said punches, and they not only generally facilitate manufacture and assembly of the machine, but are advantageous in case repairs to any of the plate-carried parts are necessary, as the proper plate may then be removed bodily with said parts, the necessary repairs made and said plate and parts replaced as a unit.

31 denotes vertically spaced openings in each plate 29, said openings slidably receiving slightly inclined punches 32 which are preferably provided with renewable terminals 33. The inner ends of these punches are formed with vertically alined eyes 34 through which vertical rods 35 pass, one rod being provided for each set of punches. Spacing sleeves 36 surround the rods 35 between the eyes 34 and additional sleeves 36′ are provided with oppositely projecting arms 37. These arms are formed with openings slidably receiving studs 38 which are rigidly carried by the plates 29, said arms constituting guides movable along the studs 38 as the punches 32 are projected and retracted. Interposed between these arms and the plates 29, are coiled compression springs 39 which act to normally retract the punches 32, the inner ends of the studs 38 being provided with appropriate stops 40 for limiting such retraction. Preferably the studs 38 are threaded into the plates 29 and the stops 40 are merely the usual heads formed on said studs.

The punches 32 and associated parts are disposed in groups about the cam shafts 26 and these shafts are provided with individual cams 41 for said groups, said cams co-acting with a number of the sleeves 36 to effect projection of the punches 32 as shown at the left of Figs. 2 and 3. Return of either shaft 26 to its normal position after projection of the punches, causes the springs 39 to again retract said punches, as will be clear from the right hand portions of Figs. 2 and 3. The sleeves 36 which engage the cams 41, constitute anti-friction rollers and may well be hardened to resist wear. As the cams force outwardly upon these rollers to effect projection of the punches 32, said cams have a tendency to cant the punches. To counteract this tendency however, I provide rollers 42 at the upper and lower ends of the rods 35 contacting with rigid fingers 43 carried by the plates 29.

Any desired means may be provided for turning the shafts 26. 44 in Figs. 1 and 2 denotes hand levers secured to the upper ends of said shafts and operable in openings 45 in the spacer 12. If desired, the shafts may be connected for turning in unison, for instance, by gear segments such as 46 of Fig. 7. When segments or the like are used, they are preferably located within the hollow plunger 10.

Any desired number of punch sets and operating shafts therefor, may be employed, according to the size and shape of the mold 8 and the plunger, determined by the character of saggar to be constructed. The machine shown in Figs. 1, 2 and 3 is for the construction of a single-banjo saggar and the sockets 21 formed in the saggar wall by the punches 32, will receive the usual pins provided for the support of the articles to be fired in said saggar. Preferably, the mold is so constructed as to provide a surplus of material 47 at the outer ends of the sockets 21, so that the latter will not materially weaken the saggar.

After operation of the plunger 10 to displace the clay and form the saggar, the punches are brought into operation to form the sockets 21, and upon retraction of said punches, the plunger is withdrawn and the completed saggar removed from the mold in the usual way. It will thus be seen that the socket-forming operation may be quickly and easily performed, in a manner greatly advantageous over the customary hand-method of socket formation.

Figs. 4, 5 and 6 disclose a mold 8$^a$ and hollow plunger 10$^a$ to form a saggar in which the articles stand on edge and are held against tilting by pins passed horizontally across the saggar. The punches 32$^a$ of this plunger 10$^a$, are disposed in horizontal rows and are of such lengths as to form openings 21$^a$ entirely through one wall of the saggar and sockets 21$^b$ in the opposite side, permitting the article-holding pins to be passed through said openings and into said sockets. The mounting means for the punches 32$^a$ are substantial duplicates of the mounting means above described and they embody detachable carrier plates 29$^a$ secured in slots 27$^a$ in opposite sides of the plunger wall. The rods 35$^a$ with which the inner ends of the punches 32$^a$ are connected, are provided with rollers or sleeves 36$^a$ co-operable with cams 41$^a$ on a horizontally disposed cam shaft 26$^a$, and the canting action of the cams upon the punches is resisted by rollers 42$^a$ and rigid fingers 43$^a$ co-operable therewith. The ends of the shafts 26$^a$ are mounted in appropriate bearings 24ᵃ secured in recesses 24ᵇ in the end wall of the plunger.

For rotating shaft 26ᵃ, I have shown it provided with a pinion 48 meshing with a gear segment 49, said segment being carried by a hand lever 50 fulcrumed at 51 upon the top plate 22ᵃ of the plunger. Preferably, the ends of the segment 49 strike this top plate to limit the rotation of the shaft 26ᵃ.

The member 52 shown in Figs. 5 and 6 is merely a conventional filler which is used when the saggar 11ᵃ is to be of less height than the distance between the plunger bottom and the top plate 22ᵃ.

In any form of the invention, the bottom of the hollow plunger may be provided with a poppet valve 52 if desired, for the purpose of admitting air to the saggar as the plunger is withdrawn from it, thus overcoming any tendency to form a vacuum and draw the saggar away from the mold 8. Air may of course find its way into the hollow plunger at numerous points and, if desired, special openings could be provided for this purpose.

Excellent results may be obtained from the general construction shown and described and hence such construction may well be followed. However, within the scope of the invention as claimed, numerous variations may be made.

I claim:—

1. A saggar-forming plunger of hollow form provided with openings from its inner to its outer periphery, saggar punches slidably received in said openings, and operating means for said punches embodying punch-projecting cams connected for rotation in unison.

2. A saggar-forming plunger of hollow form provided with openings from its inner to its outer periphery, saggar punches slidably received in said openings, and operating means for said plungers embodying a plurality of rotatable punch projecting cams mounted on a common axis substantially parallel with the plunger wall, connected for rotation in unison and disposed at the inner ends of the punches.

3. A saggar-forming plunger of hollow form provided with openings from its inner to its outer periphery, saggar punches slidably received in said openings, connecting means between the inner ends of said punches extending substantially parallel with the plunger wall, means for normally retracting said punches, and a cam shaft substantially parallel with said connecting means and rotatably carried by the plunger, said cam shaft having cam means for projecting the plungers.

4. A saggar-forming plunger of hollow form and provided with openings from its inner to its outer periphery, saggar punches slidable in said openings and having eyes at their inner ends, a rod passing through said eyes and connecting said punches for movement in unison, rollers between said eyes having openings through which said rod passes, means acting on said rod to normally retract the punches, and means engaging said rollers for simultaneously projecting said punches.

5. A saggar-forming plunger of hollow form and provided with openings from its inner to its outer periphery, saggar punches slidable in said openings and having eyes at their inner ends, a rod passing through said eyes and connecting the punches for movement in unison, sleeves on said rod having oppositely projecting guides, rigid studs carried by the side wall of the plunger and slidably received in said guides, coiled springs surrounding said studs and engaging said guides to normally effect retraction of the punches, and means for projecting said punches.

6. A saggar-forming plunger of hollow form and provided with openings from its inner to its outer periphery, punches slidable in said openings and having eyes at their inner ends, a rod passing through said eyes and connecting said punches for movement in unison, spacing sleeves on the rod between said eyes and constituting rollers, and operating means for the punches embodying cam means co-operable with said rollers.

7. A saggar-forming plunger of hollow form and provided with openings from its inner to its outer periphery, punches slidable in said openings and having eyes at their inner ends, a rod passing through said eyes and projecting beyond the endmost of the punches, spacing sleeves on the rod between the eyes and constituting rollers, additional sleeves on the projecting ends of the rod provided with oppositely projecting guides, rigid studs carried by the side wall of the plunger and slidably received in said guides, coiled springs surrounding said studs and acting against said guides to normally effect retraction of the punches, and projecting means for said punches embodying cam means co-operable with said rollers.

8. A saggar-forming plunger of hollow form and provided with openings from its inner to its outer periphery, saggar punches slidable in said openings, means connecting the inner ends of said punches for movement in unison, rollers carried by said connecting means and rigid fingers carried by the plunger wall and engaging said rollers; together with cam means at the inner ends of the punches for projecting the same, said rollers and fingers holding the punches against canting under the influence of said cam means.

9. A saggar-forming plunger of hollow form and provided with a slot which opens through both its inner and outer peripheries, a removable plate secured in said slot and having openings from its inner to its outer side, saggar punches slidable in said openings, means movably mounting said punches upon said plate for removal bodily with the latter, and means mounted within said plunger for effecting projection of the punches.

10. A saggar-forming plunger of hollow form provided with openings from its inner to its outer side, punches slidably received in said openings, cam means for projecting said punches, said cam means exerting a lateral stress on the punches, and means for resisting said lateral stress to prevent canting of the punches in the openings.

In testimony whereof I have hereunto affixed my signature.

DEWITT DILWORTH IRWIN.